United States Patent
Balabine

(10) Patent No.: US 6,631,417 B1
(45) Date of Patent: Oct. 7, 2003

(54) METHODS AND APPARATUS FOR SECURING ACCESS TO A COMPUTER

(75) Inventor: Igor Balabine, Cupertino, CA (US)

(73) Assignee: Iona Technologies PLC, Dublin (IR)

( * ) Notice: Subject to any disclaimer, the term of this patent is extended or adjusted under 35 U.S.C. 154(b) by 0 days.

(21) Appl. No.: 09/538,860

(22) Filed: Mar. 29, 2000

(51) Int. Cl.$^7$ .............................. G06F 15/173
(52) U.S. Cl. ................ 709/229; 709/202; 709/203; 709/217; 709/227; 709/228; 713/151; 713/201
(58) Field of Search ................. 709/200–203, 709/217–219, 225, 227–229; 713/150–151, 155–156, 200–202

(56) References Cited

U.S. PATENT DOCUMENTS

| | | |
|---|---|---|
| 5,550,984 A | 8/1996 | Gelb |
| 5,623,601 A | 4/1997 | Vu |
| 5,696,898 A * | 12/1997 | Baker et al. ............... 709/229 |
| 5,699,513 A | 12/1997 | Feigen et al. |
| 5,768,503 A | 6/1998 | Olkin |
| 5,778,174 A * | 7/1998 | Cain .......................... 713/201 |
| 5,784,463 A | 7/1998 | Chen et al. |
| 5,790,809 A | 8/1998 | Holmes |
| 5,805,803 A * | 9/1998 | Birrell et al. ............... 709/228 |
| 5,826,029 A | 10/1998 | Gore, Jr. et al. |
| 5,828,833 A | 10/1998 | Belville et al. |
| 5,828,893 A | 10/1998 | Wied et al. |
| 5,835,726 A | 11/1998 | Shwed et al. |
| 5,848,161 A * | 12/1998 | Luneau et al. ............. 713/151 |
| 5,864,666 A | 1/1999 | Shrader |
| 5,898,830 A | 4/1999 | Wesinger, Jr. et al. |
| 5,903,732 A | 5/1999 | Reed et al. |
| 5,915,087 A | 6/1999 | Hammond et al. |
| 5,944,823 A | 8/1999 | Jade et al. |
| 5,960,177 A | 9/1999 | Tanno |
| 5,968,176 A | 10/1999 | Nessett et al. |
| 5,983,350 A | 11/1999 | Minear et al. |
| 6,032,259 A | 2/2000 | Nemoto |
| 6,052,788 A | 4/2000 | Wesinger, Jr. et al. |
| 6,061,797 A | 5/2000 | Jade et al. |
| 6,088,796 A | 7/2000 | Cianfrocca et al. |
| 6,105,067 A * | 8/2000 | Batra ......................... 709/227 |
| 6,167,522 A * | 12/2000 | Lee et al. ................... 713/201 |
| 6,212,640 B1 * | 4/2001 | Abdelnur et al. .......... 713/201 |
| 6,345,300 B1 * | 2/2002 | Bakshi et al. .............. 709/229 |
| 6,363,478 B1 * | 3/2002 | Lambert et al. ........... 713/151 |
| 6,463,474 B1 * | 10/2002 | Fuh et al. ................... 709/229 |

OTHER PUBLICATIONS

D'Alotto, Leonard, "Internet Firewalls Policy Development and Technology Choices," Proceedings of the National Information Systems Security Conference, Oct. 22–25, 1996: 259–266.

Björn et al., "An HTTP Gateway for Interactive Relational Database Query with Deferred Reply," IEICE Trans. Inf. & Syst., vol. E78–D, No. 11, Nov. 1995: 1407–1411.

(List continued on next page.)

Primary Examiner—Bharat Barot
(74) Attorney, Agent, or Firm—Lacasse & Associates, LLC

(57) ABSTRACT

Methods and an apparatus are provided for providing secure communications around a firewall. The firewall is configured to only pass packets if they originate on a more protected side of the firewall or if they are in response to such a packet. A persistent secure connection is made from a connection manager program inside the firewall to a server outside the firewall. A protocol request message is then sent from the connection manager to the server over the secure connection. Requests arriving from a client are embedded in a protocol response message and sent to the connection manager program. After processing, the results, if any, are sent as a protocol request message to the server, which extracts the result from the protocol request message and puts the result in a protocol response message, which is sent to the requesting client.

23 Claims, 4 Drawing Sheets

OTHER PUBLICATIONS

Magavi et al., "Design and Implementation of Heterogeneous Distributed Multimedia System using Mosaic GSQL," Software–Practice and Experience, vol. 25(11), Nov. 1995: 1223–1241.

Wade, Andrew E., "Achieving Integrity:An Advantage of the Object Database Approach," Object Magazine, Aug. 1997:62–70.

Bellovin S. M., "Security Problems in the TCP/IP Protocaol Suite," Computer Communication Review, vol. 19, No. 2, Apr. 1989: 32–48.

(No Author name) "Dual–homed Gateway Firewall," Accessed on Jun. 7, 2001.

(No Author Name) "Dual–homed Gateway Firewall," Accessed on Jun. 7, 2001.

Cheswick, Bill, "Five Years of Gateways and Hackers," a slide presentation dated Apr. 20, 1990.

3Com Technical Papers, "Private Use of Public Networks for Enterprise Customers, New Standards–Based Virtual Private Networks Offer Cost Savings and Business Opportunities," 1998.

Baldwin et al., "Dial–In Security Firewall Software," *UNIX Security Symposium IV Proceedings*, Oct. 4–6, 1993: 59–62.

Bertino et al., "Database Security: Research and Practice," *Information Systems* vol. 20 No. 7: 537–556. No Date.

Cheswick et al., "A DNS Filter and Switch for Packet–filtering Gateways," *Proceedings of the $6^{th}$ Annual USENIX Security Symposium: Focusing on Applications of Cryptography*, Jul. 22–25, 1996: 15–19.

Cheswick, Bill, "The Design of a Secure Internet Gateway," *Proceedings of the Summer 1990 USENIX Conference*: 233–237.

D'Alotto, Leonard J., "Internet Firewalls Policy Development and Technology Choices," *National Information Systems Security Conference*, vol. 1, Oct. 22–25, 1996: 259–266.

Goldberg, David S., "The MITRE Security Perimeter," *Tenth Annual Computer Security Applications Conference*, Dec. 5–9, 1994: 212–218.

Goldberg et al., "A Secure Environment for Untrusted Helper Applications, Confining the Wily Hacker," Proceedings of the $6^{th}$ *Annual USENIX Security Symposium: Focusing on Applications of Cryptography*, Jul. 22–25, 1996: 1–13.

Hale et al., "MISSI Compliance for Commercial–Off–The–Shelf Firewalls," *National Information Systems Security Conference*, vol. 2, Oct. 22–25, 1996: 505–514.

Kahn, Brian L., "Safe Use of X Window System Protocol Across a Firewall," *Proceedings of the Fifth USENIX UNIX Security Symposium*, Jun. 5–7, 1995: 105–116.

Kamens, Jonathan I., "Retrofitting Network Security to Third–Party Applications—the SecureBase Experience," *UNIX Security Symposium IV Proceedings*, Oct. 4–6, 1993: 41–57.

Minear, Spencer E., "Providing Policy Control Over Object Operations in a Mach Based System,"5hu th UNIX Security Symposium, Jun. 5–7, 1995: 141–155.

Park et al., "Mini–Savepoints: Firewall for Atomic Updates," *Proceedings of the Fifth International Conference on Database Systems for Advanced Applications*, Apr. 1–4, 1997: 293–302.

Ranum et al., "A Toolkit and Methods for Internet Firewalls," *USENIX Summer 1994 Technical Conference Proceedings*, Jun. 6–10, 1994: 37–44.

Semeria, Chuck, "Internet Firewalls and Security, A Technology Overview," *3Com Technical Papers*, 1996.

Treese et al., "X Through the Firewall, and Other Application Relays," *USENIX Summer 1993 Technical Conference Proceedings*: 87–99.

Wiegel, Burkhard, "Secure External References in Multimedia Email Messages," *Third ACM Conference on Computer and Communications Security*, Mar. 14–16, 1996: 11–18.

* cited by examiner

METHODS AND APPARATUS FOR SECURING ACCESS TO A COMPUTER

FIELD OF THE INVENTION

The present invention relates generally to methods and an apparatus for providing secure remote access to a computer, and more specifically to providing secure access to a computer behind a firewall.

BACKGROUND OF THE INVENTION

The Internet is a vast, globe-spanning collection of interconnected computer networks and the associated programs, protocols, and standards that enable these computers to communicate with each other. The World Wide Web ("web"), a popular application of the Internet, relies on some of these protocols and standards to make vast collections of digital content accessible via the Internet. Because basic web technologies are relatively simple, anyone may readily publish content ranging from simple text to demanding multimedia presentations.

The globe-spanning nature of the Internet permits a user to contact any computer connected to the Internet from any other computer connected to the Internet. This fundamental property of the Internet, combined with the ease of publishing content on the web, is largely responsible for the explosive growth of the Internet as a medium of communication.

An unfortunate side effect of the globe-spanning nature of the Internet is that any computer connected to the Internet may be a target for attack by meddlesome individuals from anywhere in the world. Indeed, there are countless reports of individuals gaining unauthorized access to computers and other devices connected to the Internet. Conventional wisdom, therefore, has been that sensitive, proprietary, or confidential information should not be stored on computers connected to the Internet. To do otherwise may expose these computers to outside attacks and risk compromising any sensitive data they contain.

However, because of the rapid growth in business-to-business electronic commerce, it is often desirable or even necessary to be able to share sensitive data via the Internet. For example, a company may need to share financial projections with potential investors, or a manufacturing partner may need design specifications for a new product. One way to protect such sensitive data is to use a firewall to restrict access to the computers storing the sensitive data.

A firewall is a combination of hardware and/or software that serves as a controlled link between one network, such as the Internet, and a protected network, such as a corporate Intranet. As used herein, a network referred to as "protected" or being "inside" or "behind" a firewall refers to a network that is being protected by the firewall. Conversely, a network referred to as "unprotected" or "less-protected" or being "outside" a firewall refers to a network that is not being protected by the firewall. For instance, a corporate Intranet is generally behind a firewall, whereas the Internet is outside the firewall.

Generally, a firewall examines packets arriving at the firewall and processes the packets according to a set of rules and policies. For example, a firewall may implement a policy of forwarding packets that originate behind the firewall but may deny or drop packets originating from outside the firewall. Rules may then provide for limited exceptions to the more general policies. A common rule is to allow a packet originating outside the firewall to pass through if it is a response to a packet that originated within the protected network. A rule such as this is necessary for the Internet services that use the Transmission Control Protocol (TCP), because TCP requires a receiving computer to send acknowledgments of data that has been received.

Another common rule is to allow packets from specific IP addresses or IP domains to pass through the firewall. Such a rule may be used, for example, to provide trusted individuals with access to proprietary data stored on a computer behind a firewall. However, this type of rule is, in a sense, a small hole in a firewall that lets packets pass through. Such holes are potential weak spots that may be exploited to gain unauthorized access to a computer and to any confidential information it may contain. For example, the originating IP address of a packet may be forged using a technique known as "source spoofing" to make a packet appear to come from a "friendly" IP address or domain when in fact the packet originated elsewhere. Source spoofing is only one form of attack that may be used in an attempt to gain unauthorized access; many other methods of exploiting weaknesses in firewall security are known in the art, and new forms of attack are continually being discovered.

Therefore, in view of the forgoing, it would be desirable to provide methods and an apparatus for securing a firewall against common forms of attack.

It would also be desirable to provide methods and an apparatus for allowing packets to pass through a firewall without weakening firewall protection.

In addition, it would be desirable to provide methods and an apparatus for providing secure access through a firewall.

SUMMARY OF THE INVENTION

It is, therefore, an object of the present invention to provide methods and an apparatus for securing a firewall against common forms of attack.

It is also an object of the invention to provide methods and an apparatus for allowing packets to pass through a firewall without weakening firewall protection.

It is another object of the invention to provide methods and an apparatus for providing secure access through a firewall.

These and other objects of the present invention are achieved by providing a multiplexer and a connection manager. The connection manager, located behind a firewall, establishes an outgoing connection to the multiplexer and sends the multiplexer a request message. The multiplexer, which is located outside of the firewall, receives and queues the request message, keeping the connection open.

A server outside the firewall receives a request from a client and forwards it to the multiplexer. The multiplexer dequeues the previously queued request message and creates a response message containing the client request. The response message, including the client request, is then sent to the connection manager.

The connection manager removes the client request from the response message and sends it to a protected application, or back-end, for processing. When the processing has been completed, the connection manager sends the back-end response to the multiplexer in another request message. The multiplexer removes the response from the request message and passes the response to the outside server for sending to the requesting client.

As a result of this process, all packets passing through the firewall originate behind the firewall or are responses to packets originating behind the firewall.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which.

DETAILED DESCRIPTION OF THE INVENTION

Figure 1:
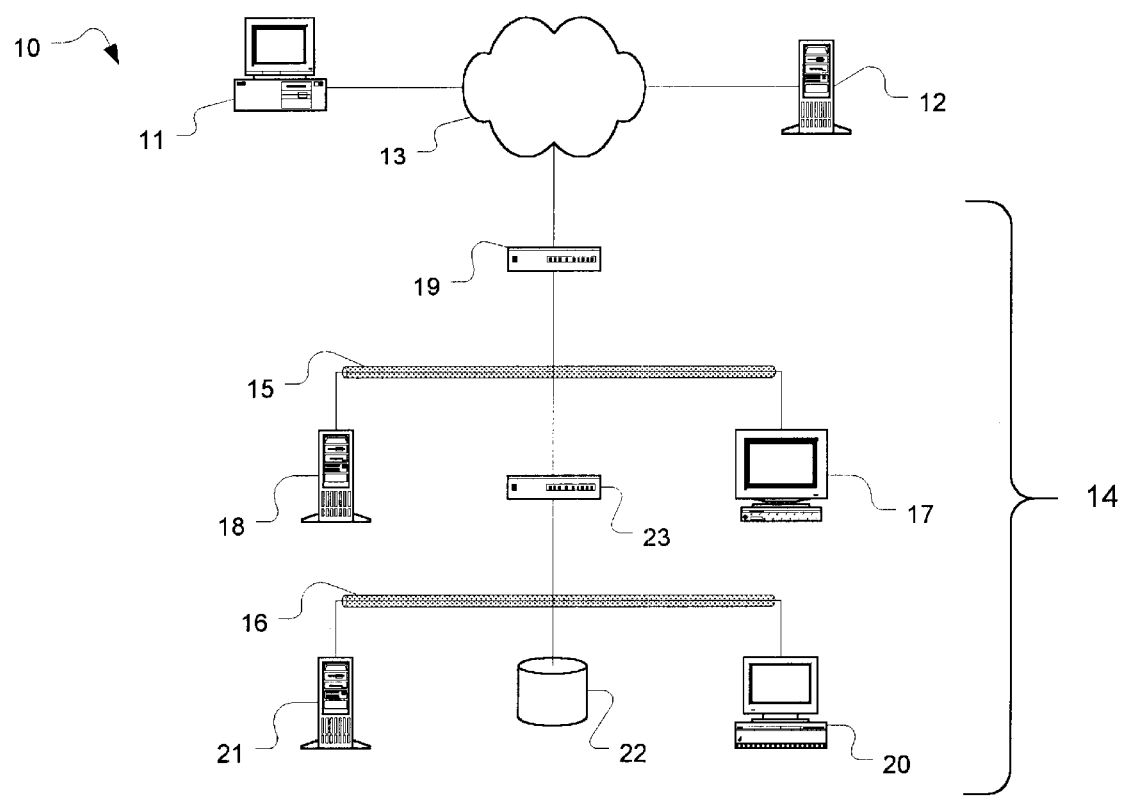
FIG. 1 is a simplified diagram of wide area network, including a hierarchical computer network connected thereto.

The web comprises many interconnected computers and networks, such as personal computer 11, web server 12, and network 13 of FIG. 1. Personal computer 11 may comprise any general purpose computer such as an IBM PC compatible computer, an Apple PowerMac, a Sun workstation, or a dumb network terminal. Web server 12 typically comprises a high-performance computer designed specifically to serve as a network server; however, in some situations, a computer similar to personal computer 11 may also be used. The computers are interconnected by network 13, which is preferably the Internet, but may be a local area network (LAN), a wide area network (WAN), a virtual private network (VPN), or other type of network.

Also shown in FIG. 1 is private network 14 comprising LANs 15 and 16 which may be, for example, a corporate Intranet comprising Ethernet-type networks. Workstation 17 and server 18 are connected to LAN 15, which in turn is connected to network 13 by outer bridge 19. Outer bridge 19, which may also be a router, switch, or other similar device, may implement a firewall to provide some protection to workstation 17, server 18, and any other device connected to LAN 15.

Workstation 20, server 21, and database 22 are connected to secure LAN 16, which in turn is connected to LAN 15 by bridge 23. Bridge 23 implements a firewall to provide increased protection to LAN 16 and the devices connected to LAN 16. By appropriately configuring the firewall on bridge 20, access to LAN 16 may be made more restrictive than access to LAN 15. For instance, bridge 20 may be configured with a policy of denying all packets originating outside bridge 20, but with a rule to let through packets originating from selected IP addresses. Such a configuration provides a range of security as may be appropriate for the computers attached to LAN 16. Thus, sensitive data should be kept on server 21 attached to LAN 16 and less sensitive, or public, information may be kept on server 18 attached to LAN 15.

However, as discussed in the background of the invention, allowing even limited access to LAN 16 through the bridge 20 firewall may provide a potential weakness that might be exploited to attack the firewall and gain access to LAN 16. Therefore, in accordance with the principles of the present invention, no packets originating from outside the bridge 20 firewall are permitted to pass through the firewall onto LAN 16.

Figure 2A:
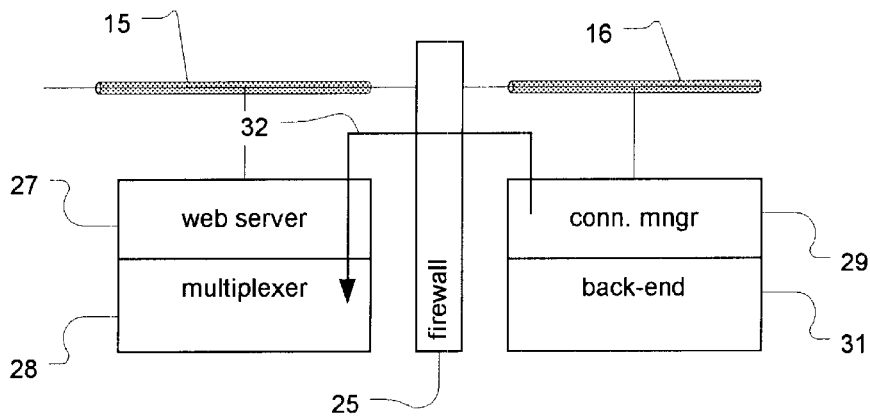
FIGS. 2A and 2B show the process of initializing the present invention.
Figure 2B:
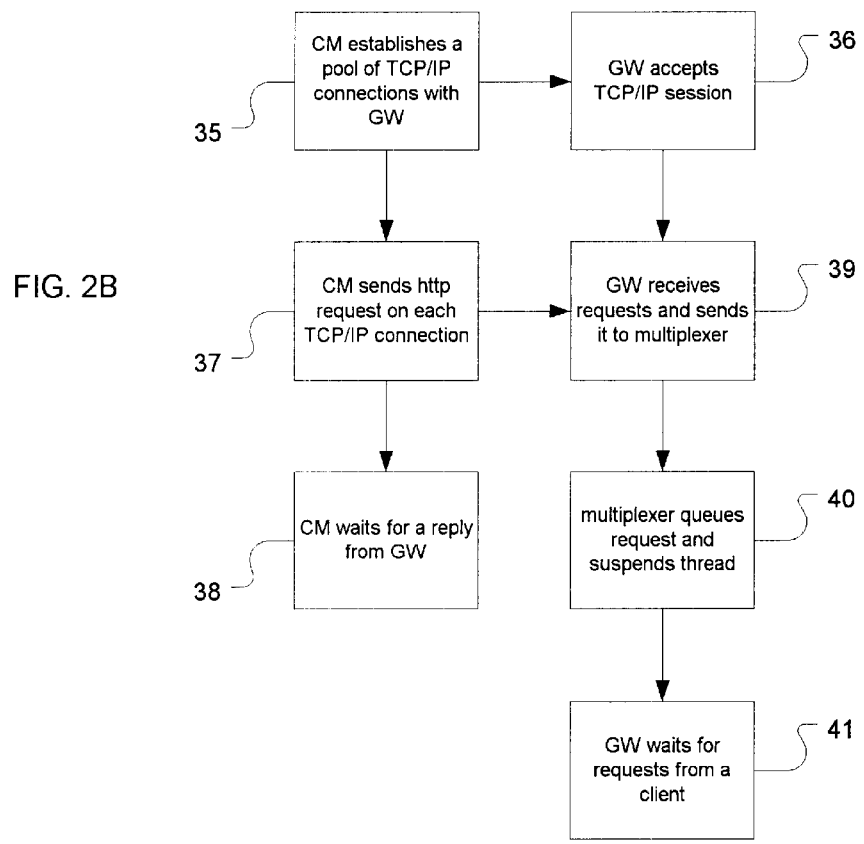

Referring now to FIGS. 2A and 2B, operation of a preferred embodiment of the present invention is described in more detail. As shown in FIG. 2A, the present invention comprises two components located on either side of firewall 25. The first component, gateway 26, comprises web server 27 and multiplexer 28 and runs on a computer or server outside of firewall 25. The second component, comprising connection manager 29, runs on a computer or server behind firewall 25. For instance, gateway 26 and connection manager 29 may be run, respectively, on servers 18 and 21 of FIG. 1. Also shown is back-end 31, which comprises one or more programs for providing services such as searching database 22 of FIG. 1.

The principles of the present invention are disclosed herein in terms of the components and arrangement shown in FIG. 1. However, one skilled in the art will understand that various other programs or modules may be used instead of, or in addition to, back end server 31, that the various components of gateway 26 may be run on the same or different computers, and that connection manager 29 and back-end 31 need not be run on the same computer. Furthermore, the description is made in terms of specific Internet protocols, which the skilled artisan will understand are selected for purposes of illustration only and that other protocols may be substituted therefor.

Gateway web server 27 is a conventional web server that supports the http or https schemes, such as the Microsoft Internet Information Server, available from Microsoft Corporation, Redmond, Washington, or the open source web server Apache, available from http://www.apache.org. Gateway web server 27 is configured to receive and process https requests received at certain specified URLs. Of these specified URLs, selected ones are configured to only accept connections from connection manager 29. In addition, firewall 25 is configured to only pass packets originating on secure LAN 16, and responses to such packets if they originate from web server 27. These configurations of gateway web server 27 and firewall 25 provide improved protection for LAN 16.

In accordance with the principles of the present invention, connection manager 29 establishes a pool of TCP/IP connections with gateway web server 27 for use in communicating across firewall 25. A process for establishing the connection pool is shown in FIG. 2B. To establish the pool of connections, at steps 35 and 36 connection manager 29 establishes a TCP/IP connection with web server 25. Preferably, the connections are secured using technologies such as secure socket layer (SSL). At step 37 http request message 32 is sent to web server 25 over the established TCP/IP connection.

---

Listing 1

POST <GW_URL> HTTP/1.1
Connection: keep-alive
Pragma: msgid="0"
Content-Length: 0
CRLF

---

An exemplary http request message is shown in Listing 1. The exemplary http request message is a POST type message conforming to the http protocol and sent to the Uniform Resource Locator (URL) identified by <$GW_{13}$ URL>, which is one of the specified URLs configured to only accept connections from connection manager 29. The header line Connection: keep-alive specifies that gateway web server 27 should keep the TCP/IP connection open after responding to the initial request. Pragma: msgid="0" identifies the http request message as a setup message, Content-Length: 0 indicates that there is no body to the http request message, and CRLF is a blank line terminating the header of the http request message.

At step 39, web server 27 accepts the https request message from connection manager 29, starts a new thread of execution, and sends the request to multiplexer 28 for processing. At step 40, multiplexer 28 stores the request in a queue, associates a wake-up event with the current thread, and suspends the tread until the wake-up event is triggered. Gateway web server 27 then waits for incoming client requests at step 41, while, at step 38, connection manager 29 waits for a response to https request message 32.

Figure 3A:
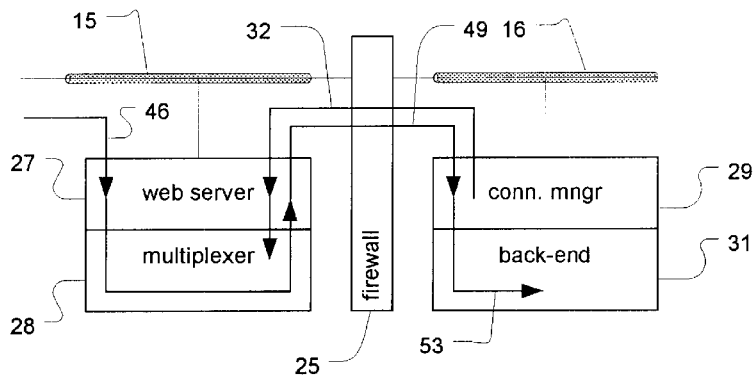
FIGS. 3A and 3B shows how client requests are passed from a less-protected network to a more-protected network.
Figure 3B:
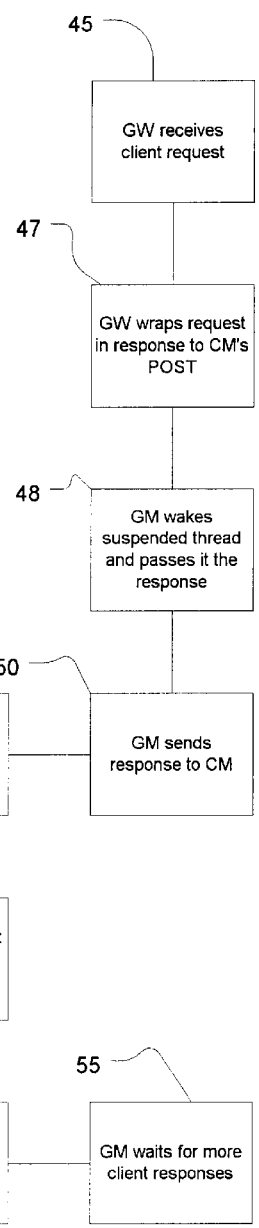

Referring now to FIGS. 3A and 3B, at step 45, gateway web server 27 receives client request message 46 at the service URL. Web server 27 invokes an appropriate thread of execution, which passes the client request message to multiplexer 28. At step 47, multiplexer 28 builds an http response message containing as its body client request message 46. Multiplexer 28 dequeues, at step 48, an https request queued at step 40 of FIG. 2B and wakes up the associated thread, passing to it the https response message containing client request message 46. Multiplexer 28 returns the response message to web server 27, which sends, at step 50, https response message 49 to connection manager 29 as a response to https request message 32 of FIG. 2A.

An exemplary https response message is shown in Listing 2. The header line Connection: keep-alive indicates that the underlying TCP/IP connection is to remain open. <Message content length> is the length of ---
Listing 2
---
HTTP/1.1 200 OK
Connection: keep-alive
Content-Length: <Message content length>
Pragma: msgid = "<N>"
MIME-Version: 1.0
Content-type: text/html
CRLF
<Client message>
CRLF
--- client request message 46 embedded in the https response message, and <N> is a unique transaction identification number for identifying the client request. <Client message> is a copy of client request message 46.

At step 51, connection manager 29 receives https response message 49 and extracts http client request message 46', saving the transaction identification number for later use. At step 52, http request message 46' is sent to back-end 31 for processing as required. Connection manager 29 also sends, at step 54, another https setup request message, similar to https setup request message 32, back to web server 27 to maintain the pool of TCP/IP connections and gateway web server 27 resumes waiting for another client request message at step 55.

Figure 4A:
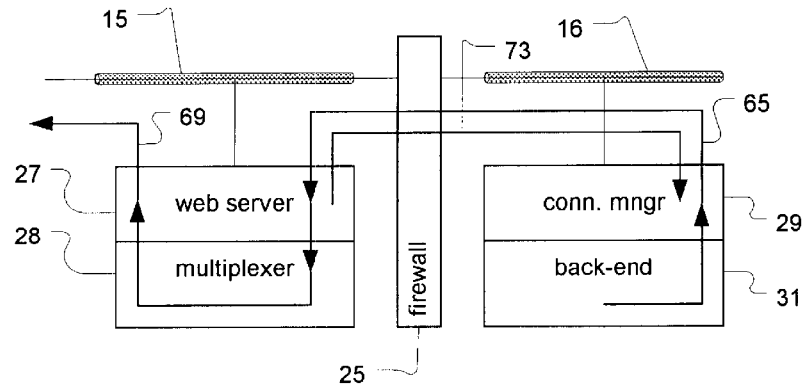
FIGS. 4A and 4B show how a response is returned from the more-protected network to the client on the less-protected network.
Figure 4B:
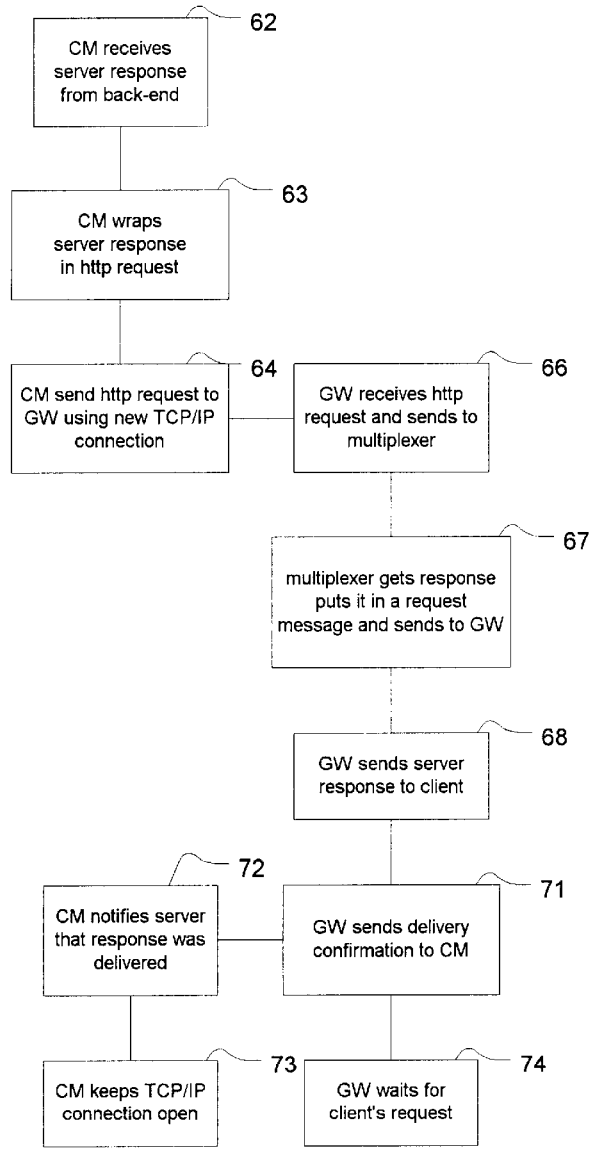

The remainder of the method of the present invention is described with reference to FIGS. 4A and 4B. When finished processing http client request 46', back-end 31

---
Listing 3
---
POST <GW_URL> HTTP/1.1
Connection: keep-alive
Pragma: msgid = "<N>"
Content-Length: <Response message length>
CRLF
<Back-end results>
CRLF
--- sends results 60 to connection manager 29. At steps 62 through 64, connection manager 29 encapsulates results in https request message 65 and sends it to web server 27. An exemplary http request message is shown in Listing 3, wherein <N> is the transaction identification number saved instep 51, <Back-end results> comprises back-end response message 60, and <Response message length> is the length thereof.

At step 66, gateway web server 27 receives http request message 65 and sends it to multiplexer 28. Multiplexer 28, at step 67, retrieves the transaction ID and back-end results 60' from https request message 65. The transaction ID is used to associate back-end result 60' with original http client request 46 of FIG. 3A. At step 68, multiplexer 28 sends server response 60' to web server 27, which sends it to the client in http client response message 69.

Multiplexer 28 also sends, via web server 27 at step 71, confirmation message 73 to indicate that http client response message 69 has been sent to the client. Gateway web server 27 and multiplexer 28 then wait, at step 74, for the next http client request. At step 75, connection manager 29 notifies back-end 31 that the response was delivered thereby signaling the end of the transaction. At step 76, connection manager 29 keeps the TCP/IP connection to gateway web server 27 open, waiting for the next https response containing a client request.

It will be appreciated by one skilled in the art that, while a preferred illustrative embodiment of the present invention is described above, the present invention may be practiced by other than the described embodiment, which is presented for purposes of illustration and not of limitation, that various changes and modifications may be made to the illustrative embodiment disclosed herein, and that the present invention is limited only by the following claims which are intended to cover all such changes and modifications which may fall within the true spirit and scope of the invention.

What is claimed is:

1. A method of providing secure access to a protected resource on a computer network, wherein the computer network includes a first server and a firewall, and wherein the first server is outside the firewall and the protected resource is inside the firewall, the method comprising:

accepting at the first server an initial request from the protected resource;

accepting at the first server a client request requiring access the protected resource;

sending from the first server to the protected resource a response to the initial request, the response including the client request;

accepting, at the first server, a second request from the protected resource, the second request including a reply to the client request; and sending the reply to the client from the first server.

2. The method of claim 1, wherein accepting the initial request and sending the response comprise using a request-response protocol.

3. The method of claim 2, wherein using a request-response protocol comprises using the hypertext transfer protocol.

4. The method of claim 2, wherein using a request-response protocol comprises using a secure protocol.

5. The method of claim 4, wherein using a secure protocol comprises using the Secure Sockets Layer protocol.

6. The method of claim 1, wherein first server comprises a web server, the method further comprising processing the client request to build the response to the initial request.

7. The method of claim 6, wherein processing the client request comprises executing a routine on the web server.

8. A method of providing secure access to a protected resource on a computer network, wherein the computer network includes a first server and a firewall, and wherein the first server is outside the firewall and the protected resource is inside the firewall, the method comprising:

sending from the protected resource an initial request to the first server;

accepting from the first server a response to the initial request, wherein the initial response includes a client request;

processing the client request to generate a reply thereto; and sending a second request to the first server, wherein the second request includes the reply to the client request.

9. The method of claim 8, wherein sending the initial request and accepting the response comprise using a request-response protocol.

10. The method of claim 9, wherein using a request-response protocol comprises using the hypertext transfer protocol.

11. The method of claim 9, wherein using a request-response protocol comprises using a secure protocol.

12. The method of claim 11, wherein using a secure protocol comprises using the Secure Sockets Layer protocol.

13. The method of claim 8, wherein processing the client request comprises sending the client request to a back-end server.

14. The method of claim 8, wherein the protected resource includes a web server and wherein processing the client request comprises executing a programmed routine on the web server.

15. The method of claim 14, wherein executing a routine on the web server comprises running a servlet on the web server.

16. Apparatus for providing secure access to a protected resource, wherein the protected resource is coupled to a computer network inside a firewall, the apparatus comprising:

a first computer located outside the firewall; and a second computer located inside the firewall;

wherein:

the first computer is programmed to:

accept an initial request from the second computer;

accept a client request requiring access the protected resource;

send to the second computer a response to the initial request, wherein the response includes the client request;

accept a second request from second computer, the second request including a reply to the client request; and send the reply to the client;

and the second computer is programmed to:

send the initial request to the first computer;

accept the response to the initial request;

process the client request to generate a reply thereto; and send the second request to the first computer.

17. The apparatus of claim 16, wherein the first and second computers are programmed to use a request-response protocol.

18. The apparatus of claim 17, wherein the first and second computers are programmed to use the hypertext transfer protocol.

19. The apparatus of claim 17, wherein the first and second computers are programmed to use a secure protocol.

20. The apparatus of claim 19, wherein the first and second computers are programmed to use the Secure Sockets Layer protocol.

21. The apparatus of claim 16, wherein first computer is programmed with routines implementing a web server.

22. The apparatus of claim 21, wherein being programmed to process the client request comprises being programmed with a servlet for processing the client request.

23. The apparatus of claim 21, wherein being programmed to process the client request comprises being programmed to send the client request to the protected resource and receiving a reply from the protected resource.

* * * * *